3,130,491
BONDING METHOD
Eustes V. Padgett, Jr., Richland, and Darl H. Warf, Pasco, Wash., assignors to the United States of America as represented by the United States Atomic Energy Commission
No Drawing. Filed July 26, 1962, Ser. No. 212,747
5 Claims. (Cl. 29—470)

This invention deals with the bonding of aluminum and in particular with an improved ultrasonic bonding process without the fusion of metal.

For many purposes it is necessary to bond parts of aluminum metal to each other, either of elemental aluminum or of an aluminum-base alloy in which the aluminum is the predominant ingredient. This is, for instance, true for some aluminum-jacketed fuel elements for nuclear reactors where small supporting pieces have to be bonded to the jacket. One type of such fuel element is illustrated on page 154, FIGURES 6–7 of "U.S. Research Reactor Operation and Use," by Joel W. Chastain, Jr., published by the Addison-Wesley Publishing Company, Inc., 1958. Bonding of aluminum parts to each other is also frequently necessary for structures of airplanes.

Aluminum metals have been bonded heretofore to each other by vibrations of ultrasonic frequencies. Ultrasonic methods are superior to other bonding processes, because the metals to be joined and any metals adjacent thereto are not heated to or above the melting point, so that the shapes and dimensions of the bodies are not affected to an undesirable degree.

In ultrasonic bonding processes the vibrations and pressure are applied to the two surfaces in shear by means of a welding tip or so-called sonotrode which is activated by the high-frequency electrical energy of a transducer. A relative motion of the pieces to be bonded is obtained by moving the sonotrode and the support for the work piece, but keeping the work piece in place.

Prior to ultrasonic bonding, the articles to be joined had to be subjected to a pretreatment comprising, consecutively, degreasing with a grease-dissolving vapor, treating with a detergent and finally removing oxide layers by chemical means.

The ultrasonic methods used heretofore have a number of drawbacks. In the first place, the friction between the sonotrode, which in the case of aluminum-bonding is usually made of stainless steel, and the aluminum surface which it contacts is less than that between the two aluminum surfaces to be bonded to each other; this causes slippage and impairs the transfer of motion. Also, in these previous methods bonding takes place in the periphery of the contact area only, so that the bonds produced do not have the necessary strength.

It is an object of this invention to provide a method of ultrasonically bonding aluminum metal to aluminum metal whereby preliminary degreasing and deoxidation treatment are not necessary.

It is another object of this invention to provide a method of ultrasonically bonding aluminum metal to aluminum metal by means of a steel sonotrode wherein the friction between the sonotrode and the aluminum metal is at least equal to the friction between the pieces of aluminum metal to be bonded.

It is also on object of this invention to provide a process for ultrasonically bonding aluminum metal to aluminum metal by which a uniform bond of high strength, such as high tensile-peel strength, is obtained.

It is furthermore an object of this invention to provide a process for ultrasonically bonding aluminum metal to aluminum metal in which a strong bond is obtained in a very short time so that the device used can operate at a high capacity.

It is finally also an object of this invention to provide a process for bonding supporting members of aluminum metal to nuclear fuel elements consisting of cores of fissionable material, jackets therearound and an intermediate bonding layer therebetween whereby the intermediate layer is not melted or otherwise disturbed.

It has been found that a layer of soap, when applied to at least one of the aluminum metal surfaces to be bonded, acts as a lubricant and reduces the friction between the two aluminum surfaces, so that slippage between the sonotrode and the aluminum piece contacting it does not occur.

The process of this invention thus comprises coating the surface of a body of aluminum metal with a thin layer of soap, placing a member of aluminum metal on the soap-coated surface of the body, and subjecting the assembly thus obtained simultaneously to vibrations of supersonic frequencies and to pressure whereby the soap decomposes and a uniform, strong bond between the body and the member is obtained.

Any sodium or potassium stearate can be used as the lubricant for the process of this invention. The soap is preferably applied in the form of an aqueous solution, the concentration of which may range between 1.5 and 4 percent by weight; a concentration of between 2.5 and 3.5 percent by weight is preferred.

Various ultrasonic welding or bonding machines known to the art are suitable for the process of this invention. A power of between 3000 and 4000 R$f$ watts and a frequency of between 15,000 and 16,000 c.p.s. were found adequate, a frequency of between 15,400 and 15,500 c.p.s. yielding the very best results.

The pressure to which the assembly is subjected during the bonding process depends to some degree on the metal and the dimensions of the body and member to be bonded. The average pressure found suitable was about 200 pounds.

In most instances a bonding time of 0.5 second was sufficient, but one second practically always was adequate and enough to break down the film of the soap. The time definitely should not be higher than 1.5 or 2 seconds in order to prevent deformation of the body or member. Of course, the time has to be sufficient to bring about decomposition of the soap, which is necessary to obtain a good metal-to-metal contact and consequently a satisfactory bond.

In the following, an example is given to illustrate the advantages of the process of this invention.

*Example*

Two parallel experiments were carried out using aluminum bodies and aluminum members of identical size. In one instance the member was bonded to the body without the use of soap, while in the other instance the aluminum body was immersed in a 3% aqueous solution of sodium stearate soap. The frequency used was 15,400 c.p.s. and the pressure was 200 pounds. The tensile-peel strength in the assembly formed without soap lubricant was 12 pounds; the bonded surface showed very little weld area. On the other hand, the assembly produced by using the soap lubricant had a tensile-peel strength of 56 pounds and weld areas of between 0.002 and 0.003 inch. This clearly shows the advantages of using the lubricant of this invention.

It will be understood that the invention is not to be limited to the details given herein but that it may be modified within the scope of the appended claims.

What is claimed is:

1. A process of securely bonding a body of aluminum metal to a member of aluminum metal, comprising coating the surface to be bonded of said body with a layer of an aqueous 1.5 to 4 percent solution of a stearate selected from the group consisting of sodium stearate and potassium stearate, placing a member of aluminum metal on the soap-coated surface of the body, and subjecting the assembly thus obtained simultaneously to vibrations of a source of supersonic frequencies and to pressure whereby slippage between said source and said member and between said source and said body is prevented, the soap decomposes and a uniform, strong bond with enlarged weld areas and increased tensile-peel strength between the body and the member is obtained.

2. The process of claim 1 wherein the soap concentration is between 2.5 and 3.5 percent by weight.

3. The process of claim 1 wherein the supersonic vibrations have a power range between 3000 and 4000 Rf watts and between 15,000 and 16,000 c.p.s. and are applied for a period of time of between 0.5 and 2 seconds.

4. The process of claim 3 wherein the frequency ranges between 15,400 and 15,500 c.p.s. and the vibrations are applied for about one second.

5. The process of claim 1 wherein the pressure applied is about 200 pounds.

References Cited in the file of this patent

UNITED STATES PATENTS 2,946,119     Jones et al. _____ July 26, 1960

FOREIGN PATENTS 572,789     Great Britain _____ Oct. 24, 1945